Figure 1:
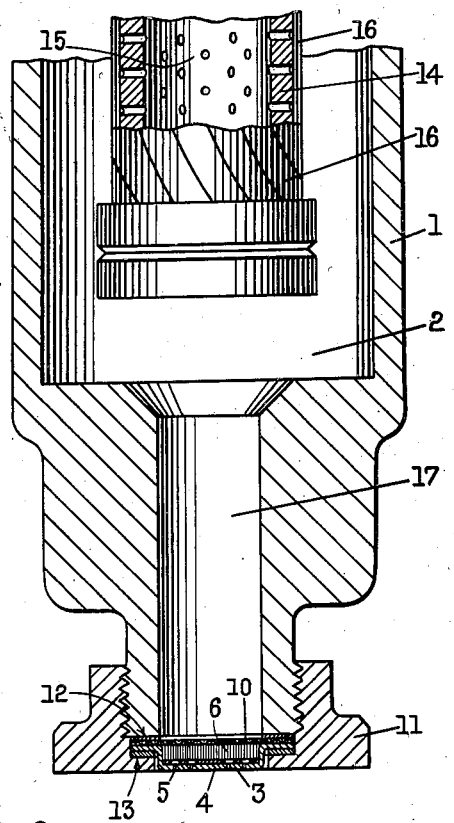

Dec. 4, 1934.  S. A. WELCH  1,983,330
MANUFACTURE OF ARTIFICIAL FILAMENTS, THREADS, FILMS, OR THE LIKE

Filed June 27, 1929   2 Sheets-Sheet 1

SIDNEY A. WELCH.
INVENTOR.
ATTORNEYS.

Dec. 4, 1934. S. A. WELCH 1,983,330
MANUFACTURE OF ARTIFICIAL FILAMENTS, THREADS, FILMS, OR THE LIKE
Filed June 27, 1929 2 Sheets-Sheet 2
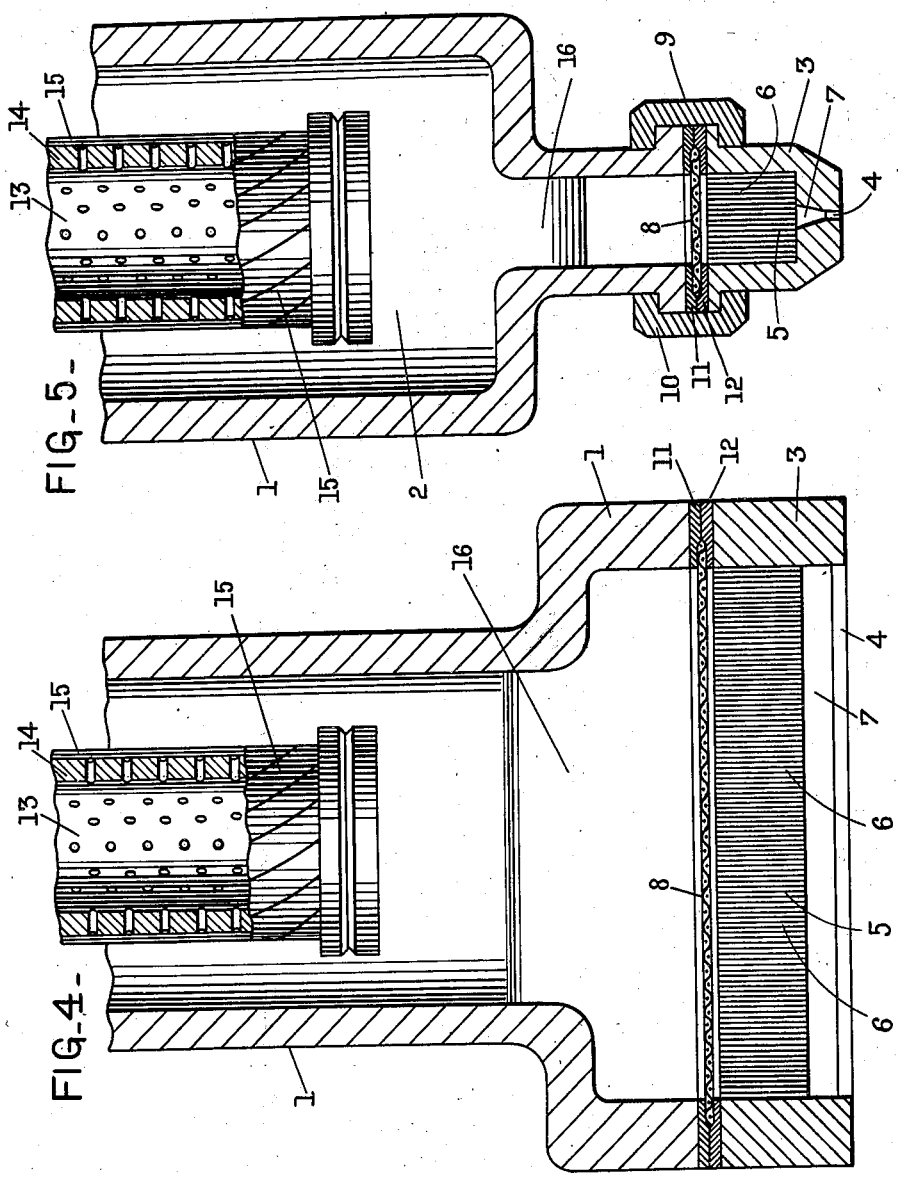
SIDNEY A. WELCH.
INVENTOR
ATTORNEYS Patented Dec. 4, 1934

1,983,330

UNITED STATES PATENT OFFICE 1,983,330

MANUFACTURE OF ARTIFICIAL FILAMENTS, THREADS, FILMS, OR THE LIKE

Sidney Arthur Welch, Spondon, near Derby, England, assignor to Celanese Corporation of America, a corporation of Delaware Application June 27, 1929, Serial No. 374,188
In Great Britain July 6, 1928

10 Claims. (Cl. 18—8)

This invention relates to the manufacture of filaments, threads, films or the like by the extrusion of solutions of cellulose or of cellulose derivatives through spinning jets, nozzles or other extrusion orifices; whether such filaments, threads, films or the like are made by the wet coagulation method or by the dry or evaporative method of formation.

According to the invention, I cause the solution of cellulose or of the cellulose derivative or derivatives to pass immediately prior to passing through the spinning jets or other extrusion orifices through a number of substantially parallel capillary passages (i. e. tubes, channels or the like) so arranged as to be substantially parallel to the line of flow taken by the solution on leaving the same.

The present invention enables the production of highly satisfactory threads, filaments, films or the like. Owing to the very efficient filtering action of the capillary tubes, channels or the like the clarity of the extruded products is of a very high order, which is especially important in the manufacture of films. Further the invention enables the production of filaments, threads, films or the like of improved strength and other physical properties, which improvement may possibly be due to the highly efficient filtration effected by the capillary tubes, channels or the like and possibly also to said tubes, channels or the like effecting in considerable measure a parallelization of the constituent particles of cellulose or cellulose derivative in the solution and enabling said particles to be coagulated to a large extent in regular and parallel order in the formation of the filament, film or the like.

For the purposes of the invention I may employ any suitable device or member formed or provided with the aforesaid capillary tubes, channels or the like; and said members or devices may be constructed from any suitable material and in any suitable manner. For instance, for employment with solutions of cellulose acetate or other cellulose derivatives in volatile solvents, the said members or devices may conveniently be formed from one or more transverse sections of cane, which sections may if desired be pretreated in any suitable manner to remove waxes or other natural impurities and which sections may if desired be soaked, prior to use, in the solution of the cellulose derivative until any swelling therein has attained the maximum. Or for instance the said members or devices may be formed from one or more plates of metal, bakelite or other suitable material moulded with or drilled with a number of very fine and closely adjacent holes. It will of course be understood that said members or devices should not be made of materials liable to attack by the solution to be extruded, for instance when extruding solutions of cellulose or of cellulose derivatives containing cellulose solvents (e. g. cuprammonium solutions, viscose solutions, solutions of cellulose or cellulose derivatives containing thiocyanates or the like) said members or devices should be made from metal or other resistant material and not from cane or other form of cellulose.

In performing the invention I arrange the said members or devices near to, or it may be even in contact with, the spinning jets or other extrusion orifices. For instance the member or device may be fitted very close to the jets or orifices (e. g. at a distance of about 1 mm. from the jet plate) in which case I preferably interpose a thin distance piece (e. g. a stamped or drilled disc or a piece of fine wire gauze) between the member or device and the back of the jet plate. Or for instance the member or device may be fitted to contact with the back of the jet plate, in which case the jets or orifices may be flared or countersunk on the side in contact with the member or device to ensure the jets or orifices receiving adequate supply of fluid from the capillaries (of the member or device) communicating therewith.

I preferably cause the solution of the cellulose or cellulose derivative or derivatives to pass through one or more filtering devices (for instance one or more cotton or like filters) prior to passing through the capillary tubes, channels or the like of the members or devices.

The solution to be extruded may if desired be caused to pass successively through a series of the said capillary tubes, channels or the like prior to passing through the set of said capillary tubes or channels which immediately precede the spinning jets or other extrusion orifices; for instance successively through one or more transverse sections of cane, the capillary tubes or channels of which are arranged substantially parallel to the line of flow of the solution prior to passing through a like section of cane immediately preceding the spinning jet or other extrusion device, and thence through the spinning jet or jets or other extrusion orifices.

For the purpose of the invention I preferably employ capillary tubes, channels or the like which are very much smaller than the diameter of the orifice through which the solution is to be extruded, for instance in the spinning of artificial silk I may advantageously cause the solution to pass through capillary tubes, channels or the like of from about 1/5 to about 1/50 of the diameter of the spinning orifice; and similarly fine capillary tubes, channels or the like are highly useful in the extrusion of films, strips and the like irrespective of the aperture of the extrusion jet or orifice.

The accompanying drawings serve to illustrate some forms of the invention in which the solution is caused to traverse a transverse section of cane in its passage to the extrusion orifice.

Figure 2:
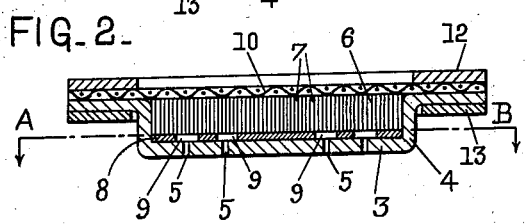
Figure 3:
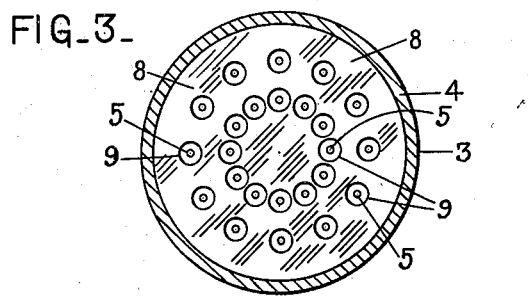

Figures 1, 2 and 3 show a form of the invention applied by way of example to the spinning of artificial silk by the dry or evaporative method from a solution of a cellulose derivative in acetone or similar volatile solvent not having a solvent action on the cane. Figures 4 and 5 show a form of the invention applied to the extrusion of films from a solution of a cellulose derivative in acetone or similar volatile solvent not having a solvent action on the cane.

Referring to Figures 1, 2 and 3. Figure 1 is a sectional view showing the transverse section of cane fitted in the lower part of a "candle" or filter containing member which terminates the supply pipe to which the spinning jet or nozzle is fitted. Figure 2 is a view of the section of cane and the spinning jet or nozzle on a larger scale; whilst Figure 3 is a plan view on the line A—B Figure 2. In Figures 1, 2 and 3, 1 is the body of the "candle" or filter containing member forming the cylindrical filter containing chamber 2, which terminates the supply pipe to the spinning jet or nozzle and to which the spinning jet or nozzle 3 is attached; the member 1, shown broken away, being attached to the supply pipe, not shown. The spinning jet or nozzle 3 is formed from a cupped plate 4 provided with extrusion orifices 5 and is fitted with a transverse section of cane 6 so arranged that the capillary tubes or channels 7 thereof are substantially parallel to the axes of the orifices 5 of the jet or nozzle 3. Between the upper face of the jet or nozzle 3 and the base of the section of cane 6 is fitted a thin plate (e. g. about 1 mm. thick) 8 provided with holes 9, the plate 8 being arranged so that the holes 9 are in register with the orifices 5 of the spinning jet or nozzle 3. The holes 9 are considerably larger than the orifices 5 (e. g. 50 or more times the diameter of the orifices 5) to ensure the jets 3 receiving adequate supply of the spinning solution from the capillary tubes or channels 7 in communication therewith. A filter 10 (composed of a number of layers of fine calico or the like) is placed on the top of the section of cane 6. The nozzle 3, plate 8, section of cane 6 and filter 10 are secured to the screwed end of the member by the annular ring or member 11, packing washers 12 and 13 being interposed, in the manner shown, respectively between the lower end of the member 1 and the filter 10 and between the nozzle 3 and the member 11. The transverse section of cane 6 is preferably treated, prior to use, with a solvent or solvents to remove wax or other soluble impurities, for instance it may be treated first with xylene and then with acetone to remove the wax and soluble impurities as far as possible. It is preferably also subjected to treatment with the artificial silk spinning solution envisaged until any swelling therein has attained substantially the maximum. Whilst the section of cane 6 may be composed of any cane having substantially parallel capillary tubes or channels I prefer to use a section of cane having capillary tubes or channels of substantially the same cross-section as each other and having capillary tubes or channels of from about 1/5 to about 1/50 of the diameter of the spinning orifices 5.

Within the chamber 2 is provided a filter member 14 comprising a perforated pipe or the like 15 which is attached to the supply pipe (not shown) and which is wound with a number of layers 16 of fine cotton, calico or the like. Assuming the apparatus to be spinning, the spinning solution (e. g. a solution of cellulose acetate in acetone) passes from the supply pipe (not shown) to the interior of the filter member 14, thence laterally through the perforated walls of the pipe or the like 15 and filter layers 16 to the chamber 2. From the chamber 2 the solution passes via the bore 17 through the filter 10. The solution passes thence through the capillary tubes or channels 7 of the section of cane 6 and the holes 9 of the plate 8 to the spinning orifices 5. From the orifices 5 the spinning solution passes to a heated spinning cell or metier wherein the artificial silk filaments are formed in the known manner.

Referring to Figures 4 and 5, Figure 4 is a front sectional view showing the transverse section of cane fitted to the lower part of a candle or filter containing device which terminates the supply pipe to which the extrusion jet or nozzle is fitted, Figure 5 is a side sectional view of the apparatus shown in Figure 4. In Figures 4 and 5, 1 is the body of the "candle" or filter containing member forming the filter containing chamber 2 which terminates the supply pipe to which the extrusion jet or nozzle orifice and to which the extrusion jet or nozzle 3 is attached; the member 1, shown broken away, being attached to the supply pipe, not shown. The extrusion jet or nozzle 3 is formed with an extrusion orifice 4 and is fitted with a transverse section of cane 5 so arranged that the capillary tubes or channels 6 thereof are substantially parallel to the line of flow of the fluid through the orifice 4. The jet or nozzle 3 is formed with a V shaped channel 7 opening into the orifice 4, this channel being provided to ensure an adequate supply of the fluid reaching the orifice 4, from the capillary tubes or channels 6. A filter 8 (composed of a number of layers of fine calico or the like) is placed on top of the section of cane 5 and the nozzles 3, section of cane 5 and filter 8 secured to the end of the member 1 by means of the angle pieces 9 and 10, packing washers 11 and 12 being fitted respectively between the filter 8 and the end of the member 1 and between the filter 8 and the top of the jet 3. The transverse section of cane 5 is exactly similar to that described with reference to Figures 1 to 3 except of course in regard to actual shape.

Within the chamber 2 is provided a filter member 13 comprising a perforated pipe 14, which is attached to the supply pipe (not shown) and which is wound with a number of layers 15 of fine cotton, calico or the like.

Assuming the apparatus to be extruding a film, the solution (e. g. a solution of cellulose acetate in acetone) passes from the supply pipe (not shown) to the interior of the filter member 13, thence laterally through the perforated walls of the pipe 14 and filter layers 15 to the chamber 2. From the chamber 2 the solution passes via the bore 16, through the filter 8. The solution passes thence through the capillary tubes or channels 6 of the section of cane 5 and via the channel 7 to the extrusion orifice 4. From the orifice 4 the solution passes to a heated chamber (or to a coagulating solution) wherein the film is formed in the known manner.

What I claim and desire to secure by Letters Patent is:—

1. Process for the manufacture of filaments, threads, films or the like by the extrusion of solutions of cellulose or of cellulose derivatives through orifices, characterized in that said solutions substantially immediately prior to passing through the orifices are caused to assume the form of a number of substantially parallel capillary streams substantially parallel to the line of flow taken by the solution thereafter.

2. Process according to claim 1 and wherein the capillary streams are substantially uniform in cross-section and have dimensions of from ⅕ to 1/50 of the diameter of spinning orifices commonly employed for the manufacture of artificial silk.

3. Process for the manufacture of artificial filaments, threads, films or the like by the extrusion of solutions of cellulose or of cellulose derivatives through extrusion orifices, characterized in that the said solutions are filtered and subsequently substantially immediately prior to passing through the extrusion orifices, are caused to assume the form of a number of substantially parallel capillary streams substantially parallel to the line of flow taken by the solution thereafter.

4. In a process for the manufacture of filaments, threads, films or the like by the extrusion of solutions of cellulose or cellulosic derivatives through extrusion orifices, the step of effecting a parallelization of the constituent particles of the solutions substantially immediately prior to the passage of the solutions through the extrusion orifices.

5. In a process for the manufacture of filaments, threads, films or the like by the extrusion of solutions of cellulose or cellulosic derivatives through extrusion orifices, the step of simultaneously filtering said solutions and effecting a parallelization of the constituent particles of the solutions substantially immediately prior to the passage of the solutions through the extrusion orifices.

6. Apparatus for the manufacture of filaments, threads, films or the like by the extrusion of solutions of cellulose or cellulose derivatives, comprising an extrusion nozzle provided with one or more extrusion orifices, a member fitted behind and in close proximity to said nozzle and provided with a number of substantially parallel longitudinal capillary passages arranged substantially parallel to the line of flow taken by the solution to the extrusion orifice or orifices.

7. Apparatus according to claim 6 and wherein the said member is fitted to the extrusion nozzle directly behind the extrusion nozzle, a thin distance piece being interposed between the said member and the feed side of the extrusion orifice or orifices.

8. Apparatus according to claim 6 for the manufacture of films and wherein the said member is fitted to the extrusion nozzle near to the feed side of the extrusion nozzle and separated from said orifice by a V-shaped chamber the narrower end of which communicates with the extrusion orifice.

9. Apparatus according to claim 6, and wherein said member is formed or provided with capillary passages of substantially uniform cross-section and of dimensions of ⅕ to 1/50 the diameter of spinning orifices commonly employed in the manufacture of artificial silk.

10. Apparatus according to claim 6, and wherein a transverse section of cane is employed as the said member.

SIDNEY ARTHUR WELCH.